United States Patent [19]

Murphy et al.

[11] Patent Number: 5,314,282
[45] Date of Patent: May 24, 1994

[54] COMPOSITE FASTENER

[75] Inventors: Guy C. Murphy, Fairfield; Barrett J. Fuhrmann, Cincinnati; Jackie D. Jones, Fairfield, all of Ohio

[73] Assignee: General Electric Company, Cincinnati, Ohio

[21] Appl. No.: 342,684

[22] Filed: Apr. 26, 1989

Related U.S. Application Data

[63] Continuation of Ser. No. 125,899, Nov. 27, 1987, abandoned.

[51] Int. Cl.$^5$ .............................................. F16B 19/04
[52] U.S. Cl. .................................. 411/426; 411/904; 411/900; 411/903; 411/501; 411/908; 244/132
[58] Field of Search ................. 244/132; 411/900, 901, 411/902, 903, 904, 907, 908, 360, 361, 501, 500–508

[56] References Cited

U.S. PATENT DOCUMENTS

| | | | |
|---|---|---|---|
| 2,685,813 | 8/1954 | Lampman et al. | 411/908 |
| 3,367,809 | 2/1968 | Soloff | 411/907 |
| 3,995,092 | 11/1976 | Fuchs | 411/900 |
| 4,623,290 | 11/1986 | Kikuzawa et al. | 411/908 |
| 4,687,395 | 8/1987 | Berecz et al. | 244/132 |
| 4,687,396 | 8/1987 | Berecz | 411/908 |
| 4,687,398 | 8/1987 | Berecz | 244/132 |
| 4,718,801 | 1/1988 | Berecz | 411/900 |

FOREIGN PATENT DOCUMENTS

| | | | |
|---|---|---|---|
| 0949144 | 2/1949 | France | 411/500 |
| 812993 | 3/1981 | U.S.S.R. | 411/908 |

Primary Examiner—Michael J. Carone
Attorney, Agent, or Firm—Jerome C. Squillaro; Carmen Santa Maria

[57] ABSTRACT

A composite fastener member, in one form, having integral head and shank portions is defined by a plurality of superimposed composite fiber reinforced sheets spirally wound about a longitudinal axis. A plurality of fastener members, oppositely disposed within an opening in an article, define a fastener especially useful in joining lightweight composite structures such as aircraft or aircraft engine components. In another form, the ends of a single spirally wound composite fastener member are splayed to fasten a plurality of sheets.

31 Claims, 3 Drawing Sheets

COMPOSITE FASTENER

This is a continuation of application Ser. No. 125,899, filed Nov. 27, 1987 now abandoned.

BACKGROUND OF THE INVENTION

The present invention relates to composite articles having at least partially mechanically joined members such as airfoils of turbomachinery blades, vanes, struts, and the like, and more particularly to a fiber reinforced composite fastener suitable for attaching composites to composites or attaching composites to metals.

Increasing usage of composite material in aircraft secondary and primary structure has focused attention on enhancement of general quality and long-term maintainability while retaining light weight. Composite airfoils, often hollow with various designs of reinforcing structure therein, utilize a variety of composite material including graphite/epoxies, graphite/glass/epoxies, and like fiber-reinforced composite material. When one member of the structure is metallic, the potential for galvanic corrosion is extremely high; aluminum fasteners and even stainless steel fastening systems can be affected. Thus, titanium fasteners frequently are specified.

Composite fasteners for composite airfoil assemblies have been the subject of prior development Droprams. For example, injection molded fiber-reinforced thermoplastic rivets and bolts were evaluated in a U.S. Air Force program reported in Report AFML-TR-79-4044, Project IR-453-7(1), June, 1979. The short fiber reinforcement, however, limited the tensile properties of such preformed thermoplastic rivets. Thus, there still is a need for development of simple composite fasteners of improved mechanical properties for joining composite to composite material or joining composite to metallic material in the formation of airfoils and other aircraft structures. The present invention is addressed to such need.

SUMMARY OF THE INVENTION

It is a principal object of the present invention to provide improved fiber composite members which can be used to define a composite fiber reinforced fastener.

Another principal object is to provide an improved method for joining composite to composite and composite to metal structures.

A further object is to provide an article constructed of a plurality of members at least a portion of which is formed by the composite fiber reinforced fastener.

These and other objects and advantages will be more fully understood from the following detailed description, the embodiments and the drawings, all of which are intended to be typical of rather than in any way limiting upon the scope of the present invention.

Briefly, one form of the present invention is directed to a composite fastener useful in composite aircraft component, especially airfoil, construction. In one of its broader aspects, the composite fastener is constructed from and comprises a thermosettable or thermoplastic parallel or unidirectional fiber reinforced composite sheet material of greater thickness at one end and which has been spirally wound generally about the fiber axis to form a tapered fiber composite fastener member having an integral head on one end. In the method of fastening composite to composite material or composite to metallic material, a hole is provided through the materials to be joined. The hole may be countersunk or not, depending upon other construction considerations. Preferably, a plurality, typically a pair, of composite fastener members each are pulled through the hole from both or opposite directions with the thicker dimensioned end or head of each composite fastener member being disposed at opposite ends of the penetrating hole to form the composite fastener. Excess material can be removed from the composite fastener members. The head of each fastener member desirably can fill a countersink location. Thereafter, the tapered fiber composite fastener is heated to a temperature adequate to thermoset the thermosettable material of the composite sheet.

In a preferred embodiment of the method of the present invention; an elastic sheath or bag surrounds a member such as the airfoil constructed of a plurality of members temporarily mechanically secured by at least one pair of tapered composite fasteners as described above. Air is then evacuated from within the elastic sheath. Thereafter, gas or air pressure is applied about the outside of the sheath along with heat, for example to cure the thermosettable tapered composite fastener members, and preferably to dress the surface of the composite fastener flush with the adjacent composite or metallic material. In one form, when the hole is not countersunk, a heated die or forming tool can be placed over the head of each fastener member to form a mushroom fastener.

Advantages of the present invention include a composite fastener which is simple in construction and design, yet maintains outstanding mechanical properties in use. Another advantage is that the tapered composite fastener members can be employed to join composite material to other composite material or metal in a simple operation. These and other advantages will be readily apparent to those skilled in the art based upon the disclosure contained herein.

The drawings will be described in detail in connection with the description of the preferred embodiments of the invention which follows.

DESCRIPTION OF THE PREFERRED EMBODIMENTS

Figure 1:
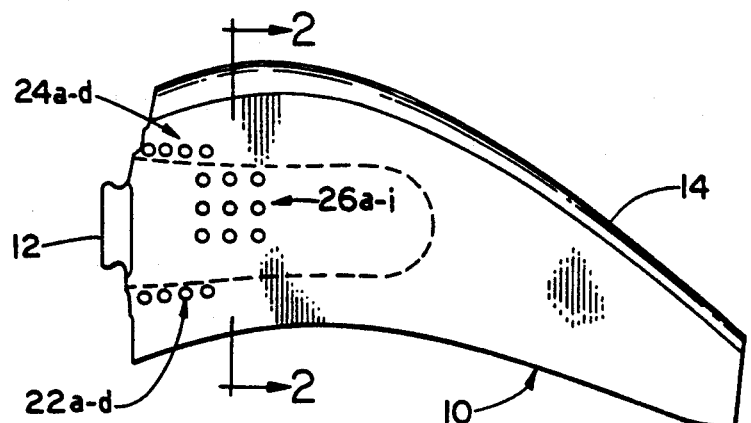
FIG. 1 is a simplified side view of an airfoil constructed with he composite fasteners of the present invention.
Figure 2:
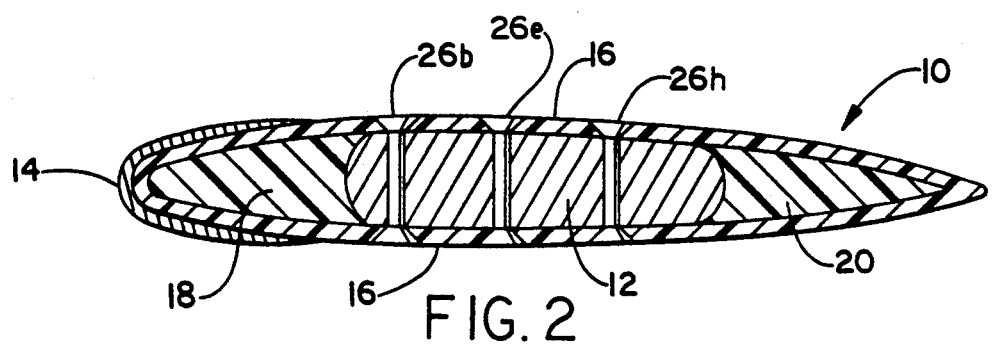
FIG. 2 is a cross-section of the airfoil of FIG. 1 taken along line 2—2.

With reference to FIGS. 1 and 2, airfoil 10 (e.g. a blade for an unducted fan engine) is a composite airfoil which has spar 12 disposed therein for attachment to a rotatable hub. Spar 12 suitably can be made from titanium or other metal. Airfoil 10 has metal strip 14 affixed about its leading edge for protection from erosion and impacting airborne particles. Outer skin 16 is a fiber-reinforced composite material, such as graphite/epoxy material. The interior of airfoil 10 contains lightweight, porous, core material, for example, foamaceous material 18 and 20, respectively at the leading and trailing edges, which may be the same or different material. Composite skin 16 is adhesively joined to the lightweight cores in conventional fashion. In this embodiment, metal bolts, e.g. titanium bolts, 22a-d and 24a-d are located adjacent the shank of airfoil 10 and adjacent spar 12. The foregoing description of airfoil 10 is merely illustrative of one of a variety of composite constructions of an airfoil which may suitably be useful in accordance with the prescepts of the present invention.

Figure 3:
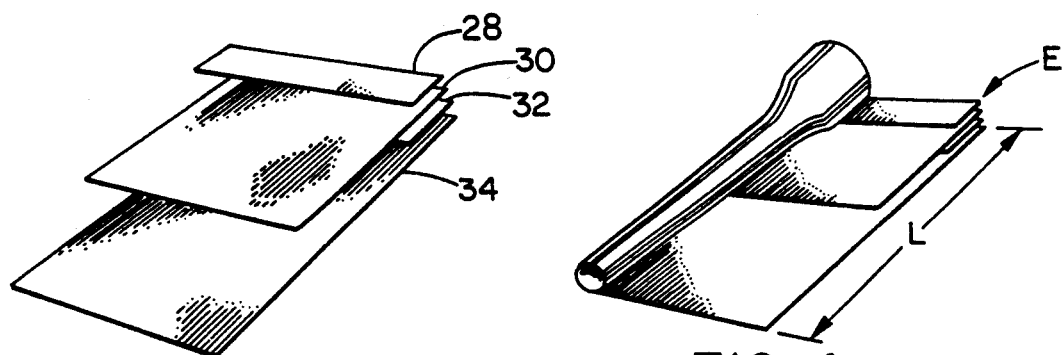
FIGS. 3-5 how a sequence of manufacture of the tapered fiber composite fastener member made from thermosetting parallel fiber composite sheets.
Figure 4:
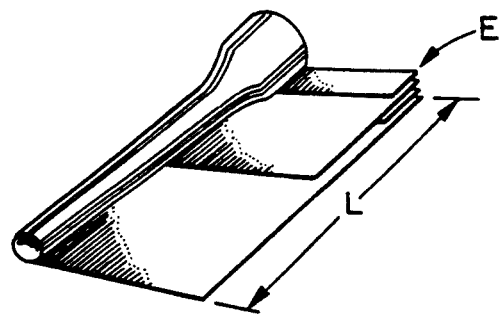
Figure 5:
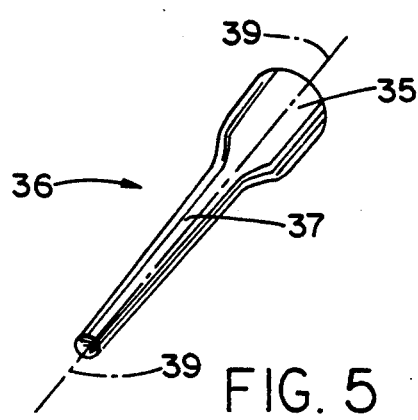

Composite fasteners 26a-i of the present invention join the oppositely disposed portions of composite skin 16 and interiorly-disposed titanium spar 12 to at least partially mechanically hold the members together to define a composite article, such as a turbomachinery blade or vane. The formation of a member of composite fasteners 26 in FIGS. 1 and 2 is illustrated in FIGS. 3-5. Appropriately sized composite sheets 28, 30, 32 and 34, as shown, comprise unidirectional or parallel fiber reinforced composite material, the fibers of which are generally oriented along a fiber axis. The fibers forming the composite sheets may be glass, graphite, ceramic, polymeric, or other material as is necessary, desirable, or convenient. When a thermosetting resin is used, the thermosetting resin portion comprising the composite sheets may be any suitable thermosetting material including epoxy resin, polyimide resin, or the like. It is desirable that certain and preferably all of the composite sheets contain substantially parallel or unidirectional fiber running longitudinally the length of each composite sheet 28, 30, 32 and 34. This will result in the fibers being oriented longitudinally in the fastener member and ultimately the fastener itself. It should be recognized, however, that the interposition of a sheet having fibers of other orientations, for example running transverse thereto, especially at the upper head section of the headed form may be an alternative embodiment to be employed for achieving special effects or in other applications. Nevertheless, as illustrated in FIG. 4, the plurality of different length size along length "L" of composite sheets 28, 30, 32 and 34 are disposed with their first edges "E" aligned and are generally spirally wound about a fiber axis 39 to form tapered fiber composite fastener member 36, as illustrated in FIG. 5. Fastener 36 is comprised of a head portion 35 and a shank portion 37 defined by a plurality of spirally wound fiber reinforced composite sheets with the fibers oriented along the longitudal fiber axis 39. Unlike prior composite fasteners, which utilize various designs of cured composite fasteners. tapered fiber composite fastener member 36 is not cured or thermoset prior to its use in a composite fastener in joining the materials of choice.

Figure 6:
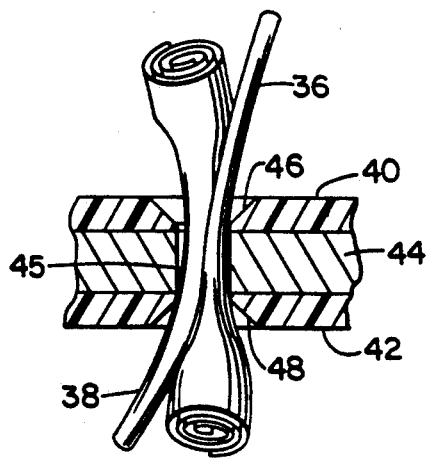
FIGS. 6-8 are partial sectional views of an airfoil and depict the composite fastener members, respectively, being set in place, cured, and the resulting structure.
Figure 7:
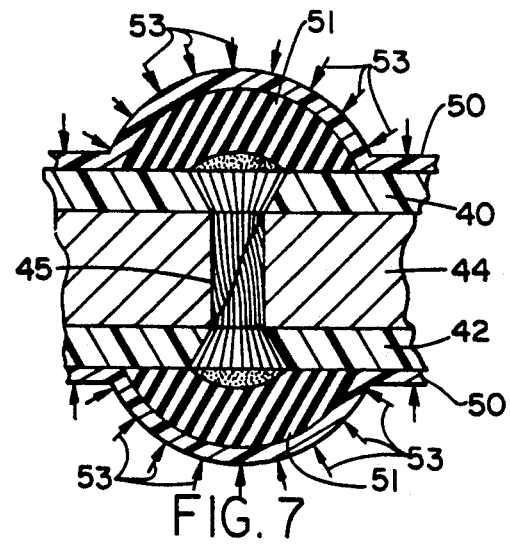
Figure 8:
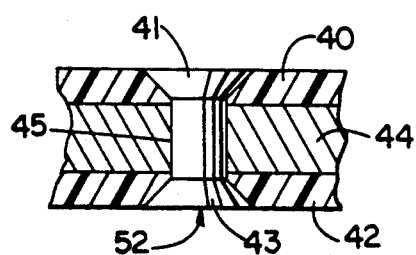

FIGS. 6-8 show respectively in sequential steps one method form of the present invention including the use of a pair of tapered fiber composite fastener members 36 and 38 of the present invention for joining composite skin 40 and composite skin 42 to titanium spar 44 through an opening such as 45 in the drawings. It will be appreciated that the materials being fastened or joined do not have to be in the sequence illustrated nor in the number illustrated in FIGS. 6-8. Thus, composite fastener members 36 and 38 suitably may join a composite material to a composite material, or a composite material to a metallic material, and the like. The specific illustrations set forth in FIGS. 6-8 follow construction of airfoil 10 described above. It will be observed that a pair of tapered fastener members are employed to join composites 40 and 42 to titanium spar 44. It will be appreciated that more than two tapered composite fasteners could be employed if necessary, desirable, or convenient. In this embodiment, countersink 46 is formed in composite skin 40 and countersink 48 is formed in composite skin 42. The head of fastener members 36 and 38 are in a size suitable for filling such countersinks. Of course, employment of such indentations is not necessary for practice of the Present invention, as will be further discussed with reference to FIG. 10.

After composite fastener members 36 and 38 are pulled snuggly through the hole penetrating skins 40 and 42, and interior metal piece 44, the excess smaller, tapered ends are trimmed. As illustrated in FIG. 7, desirably, the assembly is placed within elastic sheath or bag 50 along with plastic forming tool 51 such as of silicone rubber as shown in FIG. 7. In that figure, gaseous pressure, such as from an autoclave, is represented by arrows 53. Thereafter the air is evacuated from the bag.

Figure 9:
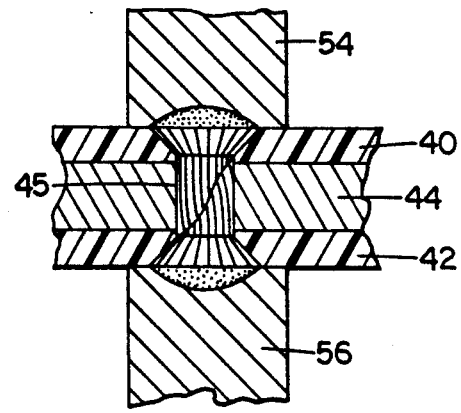
FIG. 9 shows an alternative curing procedure to that of FIG. 7.

Curing of the resin portion of composite fastener members 36 and 38 to form a composite fastener employs heat such as from an oven or autoclave which can maintain a suitable temperature necessary to set or cure such resin. Also, the autoclave can be appropriately pressurized, e.g. 50-100 psig pressure, while heating of the assembly, for further densification of the cured fastener and to assist in dressing the fastener heads 41 and 43 flush with the other surfaces of composite skins 40 and 42, as illustrated at FIG. 8. Note that the resulting cured composite fastener 52 of the present invention is an integral structure firmly holding the assembly together at least partially mechanically. Cured composite fastener 52, if of the same material, has been observed to be generally homogeneous in composition and to possess excellent tensile strength. Of course, it will be appreciated that the two or more composite fastener members of the present invention utilized in joining composite skins 40 and 42 to metal spar 44 may be different in composition. Although the method described in connection with FIGS. 6-8 employing an elastic sheath or bag 50 is convenient, other method forms can be used. For example, as shown in FIG. 9, a pair of opposed, heated forming tools or dies 54 and 56 can be used.

Figure 10:
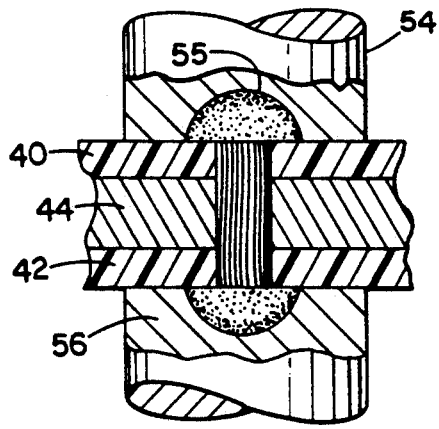
FIG. 10 shows still another method when a mushroom-shaped rivet head on the composite fastener is desired.
Figure 11:
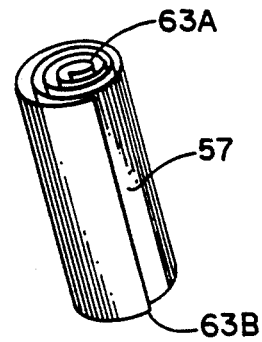
FIGS. 11-13 show the use of a single composite fastener member in fastening structures.

When countersinks are not desired on one or both outer surfaces, heated forming tools or dies 54 and 56, illustrated in FIG. 10, may be utilized in order for forming a rounded head 55 or mushroom head rivet. The dies are provided with appropriately shaped recesses, as shown, in which such heads are formed during application of pressure.

Figure 12:
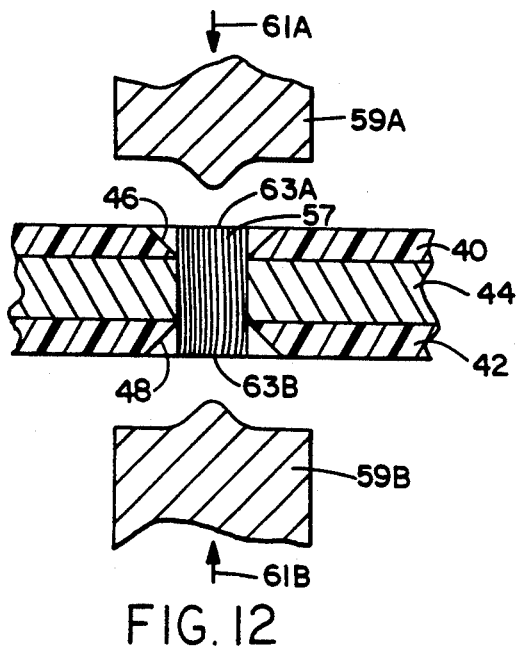
Figure 13:
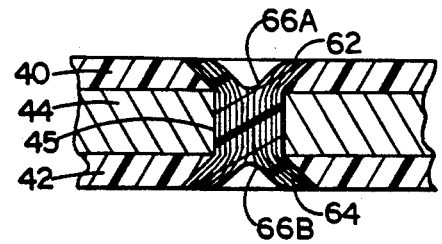
Figure 14:
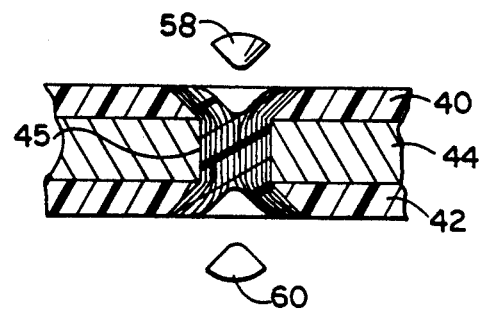
FIGS. 14 and 15 show use of a composite molded plug in conjunction with the composite fasteners of the present invention shown in FIGS. 11-13.
Figure 15:
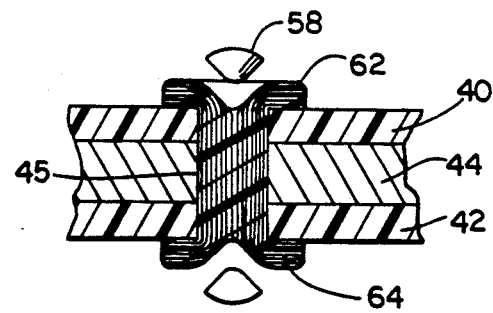

Other embodiments of the present invention are shown in FIGS. 11, 12, 13, 14 and 15. They employ the single spirally wound composite fastener member 57 of FIG. 11, having first and second ends 63A and 63B and disposed in opening 45. As shown, ends 63A and 63B are accessible through the ends of the opening. Member 57 then is secured by the application of pressure such as through use of appropriately shaped tools 59A and 59B, as shown in FIG. 12. The components to be joined are preheated to lower the viscosity of the resin matrix, or melt thermoplastic material. This allows the members 36 and 38 in FIG. 6 to debulk during the pulling through the opening 45 and the resin to fully wet out the hole. This promotes bonding of the fastener to the hole and countersinks, where used. Tools 59A and B, FIG. 12, as well as tools 54 and 56, FIGS. 9 and 10, can be heated. Alternately, they can be silicone rubber forming tools under a pressure bag as shown in FIG. 7. Such tools are moved, as shown by arrows 61A and 61B, toward the respective ends of member 57 to splay the material of member 57 into countersinks 46 and 483, respectively in FIGS. 12, 13 and 14, or over the surface of members 40 and 42 as shown in FIG. 15 if no countersink is used and a rounded type head is desired as described in connection with FIG. 10. This action result in the arrangement shown in FIGS. 13 and 15 in which edges 62 and 64 of member 57 are generated with depressions 66A and 66B being formed and edges 62 and 64 being produced with reduced thickness as in FIG. 13. If it is desired to fill such void areas, for example for aerodynamic reasons, appropriately shaped composite plugs 58 and 60 in FIGS. 14 and 15 can be added to fill the depressions 66A and 66B; which generally will be conical in shape because openings of generally circular cross sections are being filled. In that form of the present invention, plugs 58 and 60 are disposed in the respective depressions and are secured to the balance of the fastener such as by heat and pressure using heated tools or the autoclave-type methods described above. Alternatively, plugs 58 and 60 may be added and joined integrally during the fastener formation process as described above, if necessary or desirable. For example, such plugs can be premolded composite conical plugs and can be used as a part of tools 59A-and 59B in FIG. 12, being separable therefrom upon withdrawal of such tools after processing.

In order to demonstrate the excellent tensile strength supplied by the fiber composite fasteners of the present invention, various mechanical testing was undertaken. The specific material used to manufacture the fiber reinforced composite fastener members of the present invention for this evaluation was Scotchply 250-E36-RC (Minnesota Mining and Manufacturing Co., Minneapolis, Minn.). Such material is a glass/epoxy parallel fiber prepeg material containing 36% resin, type E glass fiber, and having a maximum cure temperature of 250° F. Also tested for comparison was a titanium bolt as well as a hardened steel bolt.

Figure 16:
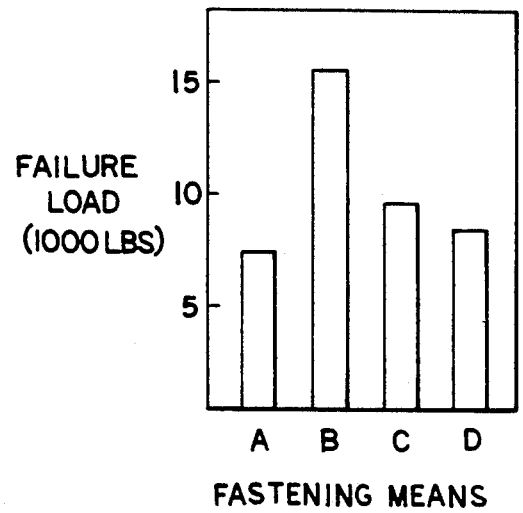
FIG. 16 is a bar graph depicting the shear strength results for the tapered composite fasteners of the present invention and conventional metallic fasteners.

A shear test involved manufacturing specimens of the type shown in FIGS. 8 and 9 then pulling the two outer composite sheets 40 and 42 together and in one direction parallel to each other with the intermediate titanium spar piece 44 being pulled in the opposite direction. The result of this shear test is set forth in FIG. 16. In FIG. 16, bar A represents the failure load for a composite assembly joined by a titanium alloy bolt; the failure mode was yielding in the bolt. Bar B represents the failure load for an assembly joined by a hardened steel bolt; in this case, the test load was limited by local crushing of the composite materials joined by the bolt. Bars C and D represent failure loads for composite fasteners of the present invention, having mushroom shaped heads and flush heads, respectively; in both cases, failure occurred through failure of the fastener. Note that the shear strength of both types of fiber composite fasteners of the present invention exceeded that of the titanium bolt, which might otherwise be used in the joining of composite skins to titanium. The good shear resistance possessed by the fasteners of the present invention was true for both the headed and the flush-type composite fasteners.

Another important feature of the use of the present invention relates to the tapered fiber composite fastener members possessing improved design flexibility over bolted joints. For bolted joints, the surfaces on which the bolt and nut bear either must be parallel or must be conical surfaces having the same axis. Such was the case for the bolts as tested and reported in FIG. 16. This axial alignment limitation of metal bolts may require that appropriate features for the bearing surfaces, such as counterbores, be designed into parts such as fan blades. The composite fastener of the present invention does not have such restrictions. That is, the fan blade fastener holes were countersunk on the outer composite surfaces so that the axis of the countersink was perpendicular to the surface, not necessarily parallel to the axis of the fastener shank. Such design flexibility through use of the tapered fiber composite fastener members of the present invention again contributes to the invention's utility over conventional metal rivets or bolts in many design applications.

What is claimed is:

1. A fiber reinforced composite fastener member comprising:
    an integral head portion and shank portion which together define a shape tapered from the head portion to the shank portion and oriented generally about a longitudinal axis;
    the fastener member being defined by a plurality of superimposed composite sheets having reinforcing fibers, the sheets being spirally wound about the axis.

2. The member of claim 1 in which the reinforcing fibers are generally oriented substantially parallel to the longitudinal axis.

3. The member of claim 1 in which the superimposed sheets include sheets of different sizes and the sheets are positioned predominantly at the head portion.

4. The member of claim 1 in which the composite sheets include a thermosetting resin in which the reinforcing fibers are disposed.

5. The member of claim 1 in which the composite sheets include a thermoplastic resin in which the reinforcing fibers are disposed.

6. A fiber reinforced composite fastener comprising:
    at least a pair of fastener members, each member having an integral head portion and shank portion which together define a shape tapered from the head portion to the shank portion and oriented generally about a longitudinal axis, and each member being defined by a plurality of superimposed composite sheets having reinforcing fibers, the sheets being spirally wound about the axis, the head and shank portions of one member being oppositely disposed to another member through an opening in an article;
    the fastener members being in intimate contact one with the other to define together the composite fastener with opposing head portions.

7. The fastener of claim 6 in which the reinforcing fibers are generally oriented longitudinally of the fastener.

8. The fastener of claim 6 in which the composite sheets include a thermosetting resin in which the reinforcing fibers are disposed.

9. The fastener of claim 6 in which the composite sheets include a thermosetting resin in which the reinforcing fibers are disposed.

10. A composite article comprising a first member and a second member, each article member having an opening, and a fiber reinforced composite fastener having a pair of fastener members disposed through the openings to secure the first and second article members, each fastener member having an integral head portion and shank portion which together define a shape tapered from the head portion to the shank portion and oriented generally about a longitudinal axis, and each fastener member being further defined by a plurality of superimposed composite sheets having reinforcing fibers, the sheets being spirally wound about the axis, the head and shank portion of the first fastener member being oppositely disposed to the head and shank of the second fastener member through the openings in the article members, the fastener members further being in intimate contact one with the other within the openings to define together the composite fastener having opposing head portions.

11. The composite article of claim 10 wherein a fiber reinforced composite material comprises the first article member, and wherein a material selected from the group consisting of composite materials and metallic materials comprises the second article member.

12. The article of claim 11 wherein the reinforcing fibers of the fastener members are generally oriented longitudinally of the fastener.

13. A composite article comprising a first member and a second member, the article including an opening through both the first and second members, and a fastener disposed through the opening to secure the first and second members, wherein the fastener comprises:
a single spirally wound composite fastener member having first and second ends,
the first and second ends being splayed to secure the fastener in the opening and the first and second members together, at least one of the splayed first and second ends including a depression therein; and
a plug bonded in the depression.

14. In a composite airfoil comprising a composite material and a material selected from the group consisting of a composite material and a metal, which composite airfoil has a hole penetrating therethrough bearing a fastener, the improvement which comprises a thermosetting resin, fiber reinforced composite fastener formed from composite sheet having the fiber oriented along a fiber axis, and of thicker dimension at one end, the sheet being spirally disposed about the fiber axis to form a tapered fiber composite fastener.

15. The composite airfoil of claim 14 wherein said tapered fiber composite fastener is formed from a plurality of different sized parallel fiber sheets with more than one sheet forming the thicker portion thereof.

16. The composite airfoil of claim 14 wherein said parallel fiber composite sheet comprises parallel glass fiber/epoxy resin composite sheet material.

17. The composite airfoil of claim 15 which comprises a composite material fastened to a composite material.

18. The composite airfoil of claim 14 which comprises a composite material fastened to a metal.

19. The composite airfoil of claim 14 wherein a plurality of said tapered fiber composite fasteners form said fastener in said hole.

20. The composite airfoil of claim 14 wherein a pair of said tapered fiber composite fasteners with the thicker portion of each on opposite sides of said hole form said fastener.

21. A method of making a fiber reinforced composite sheets at least some of which are smaller along a length than others of the plurality;
stacking the plurality of sheets one upon the other so that first edges of the sheets substantially are superimposed and aligned; and then,
spirally winding the stacked sheets generally about a longitudinal axis along the length whereby the head portion on one end is formed integrally with the shank portion.

22. The method of claim 21 wherein fibers reinforcing the composite sheets are generally oriented substantially parallel to the longitudinal axis.

23. The method of claim 21 in which the composite sheets include in thermosetting resin.

24. The method of claim 21 in which the composite sheets include a thermoplastic resin.

25. In a method of making a fiber reinforced composite fastener in place within an opening through an article, the opening having opposed first and second ends, the steps of:
providing a pair of fastener members, each member having an integral head portion and shank portion which together define a shape tapered from the head portion to the shank portion and oriented generally about a longitudinal axis, and each member being defined by a plurality of superimposed composite sheets having reinforcing fibers, the sheets being spirally wound about the axis;
disposing the shank portion of a first of the pair through the first end of the opening;
disposing the shank portion of a second of the pair through the second end of the opening; and
pressing the head portions of the pair of members one toward the other and toward the hole to press the pair of members into contact with one another.

26. The method of claim 25 in which:
the shank portion protruding from the opening is removed; and
heat is applied to consolidate the pair of members into the fastener.

27. A method for making a composite fastener for use in composite airfoil construction which comprises:
overlaying a plurality of different size resin bonded, fiber reinforced composite sheets with the fibers of all sheets being parallel along a fiber axis and such that the resulting overlay is of a thicker dimension at one end than the other end; and,
spirally winding said overlay about the fiber axis to form a tapered fiber composite fastener.

28. The method of claim 27 wherein said sheets comprise parallel glass fiber/epoxy resin composite sheets.

29. The method of claim 27 wherein:
said fiber is selected from the group consisting of glass, graphite, ceramic, or polymeric fiber; and, said resin of said composite sheet is selected from the group consisting of an epoxy resin, thermoplastic, a polyimide resin, a ceramic matrix material, and mixtures thereof.

30. A method for making a fiber reinforced composite fastener in place within an opening through an article, the opening having opposed first and second opening ends, comprising the steps of:

providing at least one spirally wound composite sheet having first and second member ends, disposing the fastener member through the opening whereby the first and second member ends are accessible at the first and second opening ends; and then splaying the first and second member ends to secure the fastener on the opening.

31. The method of claim 30 in which:

the step of splaying forms a depression in at least one of the member ends; and then, a plug is bonded in the depression.

* * * * *